US012091898B2

(12) United States Patent
Goetz

(10) Patent No.: US 12,091,898 B2
(45) Date of Patent: Sep. 17, 2024

(54) GUIDE SYSTEM FOR GUIDING A MOVABLY MOUNTED DOOR LEAF

(71) Applicant: Julius Blum GmbH, Hoechst (AT)

(72) Inventor: Christof Goetz, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 646 days.

(21) Appl. No.: 17/319,735

(22) Filed: May 13, 2021

(65) Prior Publication Data

US 2021/0262269 A1 Aug. 26, 2021

Related U.S. Application Data

(63) Continuation of application No. PCT/AT2019/060348, filed on Oct. 18, 2019.

(30) Foreign Application Priority Data

Nov. 14, 2018 (AT) .............................. A 50998/2018

(51) Int. Cl.
*E06B 3/50* (2006.01)
*E05D 15/26* (2006.01)
(Continued)

(52) U.S. Cl.
CPC ......... *E05D 15/581* (2013.01); *E05D 15/264* (2013.01); *E06B 3/50* (2013.01);
(Continued)

(58) Field of Classification Search
CPC .......... E06B 3/5045; E06B 3/50; E06B 3/924; E05Y 2900/208; E05Y 2201/64;
(Continued)

(56) References Cited

U.S. PATENT DOCUMENTS 4,610,291 A * 9/1986 Carroll .................... F24S 60/10 49/63
4,945,972 A * 8/1990 Takeuchi .............. E05D 15/264 49/257
(Continued)

FOREIGN PATENT DOCUMENTS

AT 519374 6/2018
CN 104080992 3/2016
(Continued)

OTHER PUBLICATIONS

Search Report issued on Mar. 15, 2022 in corresponding Chinese Patent Application No. 201980075071.9.
(Continued)

*Primary Examiner* — Phi D A
(74) *Attorney, Agent, or Firm* — Wenderoth, Lind & Ponack, L.L.P.

(57) ABSTRACT

A guide system for guiding at least one movably-supported door wing, in particular a folding-sliding-door, relative to a stationary furniture part. The guide system includes a carrier for movably supporting the at least one door wing, a guide rail configured to be fixed to the stationary furniture part for guiding the at least one carrier, a guiding device for displaceably supporting the at least one carrier along the guide rail, a running carriage configured to be coupled to the at least one door wing, and a receiving device for receiving the at least one running carriage. The receiving device adjoins the carrier in a longitudinal direction of the carrier, and the receiving device is movably supported relative the carrier in the longitudinal direction of the carrier.

16 Claims, 6 Drawing Sheets

(51) Int. Cl.
*E05D 15/58* (2006.01)
*E06B 3/92* (2006.01)

(52) U.S. Cl.
CPC .............. *E06B 3/924* (2013.01); *E05D 15/58* (2013.01); *E05Y 2201/64* (2013.01); *E05Y 2201/684* (2013.01); *E05Y 2201/688* (2013.01); *E05Y 2900/212* (2013.01)

(58) Field of Classification Search
CPC ......... E05Y 2201/684; E05Y 2201/688; E05Y 2900/212; E05Y 2800/244; E05Y 2800/276; E05Y 2800/372; E05Y 2800/404; E05Y 2800/406; E05D 15/581; E05D 15/264; E05D 15/58
See application file for complete search history.

(56) References Cited

U.S. PATENT DOCUMENTS

| | | | | |
|---|---|---|---|---|
| 5,131,449 | A * | 7/1992 | Winn | E06B 3/5045 160/214 |
| 8,336,972 | B2 | 12/2012 | Haab et al. | |
| 8,522,398 | B2 | 9/2013 | Haab et al. | |
| 9,057,216 | B2 * | 6/2015 | Bortoluzzi | E05F 5/00 |
| 9,068,386 | B2 | 6/2015 | Ishii et al. | |
| 9,284,761 | B2 | 3/2016 | Haab et al. | |
| 9,624,705 | B2 | 4/2017 | Haab et al. | |
| 10,400,493 | B2 * | 9/2019 | Gabl | E05D 15/264 |
| 2009/0289463 | A1 | 11/2009 | Tsai | |
| 2010/0269291 | A1 | 10/2010 | Haab et al. | |
| 2010/0270898 | A1 | 10/2010 | Haab et al. | |
| 2013/0232878 | A1 * | 9/2013 | Bortoluzzi | E05D 15/58 49/252 |
| 2014/0150208 | A1 | 6/2014 | Haab et al. | |
| 2015/0008811 | A1 | 1/2015 | Ishii et al. | |
| 2016/0201368 | A1 | 7/2016 | Haab et al. | |
| 2019/0284859 | A1 | 9/2019 | Rupp et al. | |
| 2019/0301216 | A1 | 10/2019 | Rupp et al. | |
| 2019/0330898 | A1 | 10/2019 | Rupp et al. | |

FOREIGN PATENT DOCUMENTS

| | | |
|---|---|---|
| CN | 106320906 | 1/2017 |
| CN | 207513462 | 6/2018 |
| DE | 43 08 196 | 10/1993 |
| DE | 199 01 188 | 7/2000 |
| DE | 10 2011 000 132 | 7/2012 |
| EP | 2 288 775 | 3/2011 |
| EP | 2 829 452 | 6/2014 |
| JE | 6-212854 | 8/1994 |
| JP | 6-37480 | 5/1994 |
| JP | 2014-114690 | 6/2014 |
| TW | I494496 | 8/2015 |
| TW | 2018/31770 | 9/2018 |
| TW | 201837292 | 10/2018 |
| WO | 2009/138649 | 11/2009 |
| WO | 2011/161707 | 12/2011 |
| WO | 2018/129568 | 7/2018 |
| WO | 2018/129575 | 7/2018 |

OTHER PUBLICATIONS

International Search Report issued Jan. 27, 2020 in International (PCT) Application No. PCT/AT2019/060348.

* cited by examiner

GUIDE SYSTEM FOR GUIDING A MOVABLY MOUNTED DOOR LEAF

BACKGROUND OF THE INVENTION

The present invention relates to a guide system for guiding at least one movably-supported door wing, in particular a folding-sliding-door, relative to a stationary furniture part. The guide system includes at least one carrier for movably supporting the at least one door wing, at least one guide rail configured to be fixed to the stationary furniture part for guiding the at least one carrier, at least one guiding device for displaceably supporting the at least one carrier along the guide rail, at least one running carriage configured to be coupled to the at least one door wing, and at least one receiving device for receiving the at least one running carriage, the at least one receiving device adjoining the at least one carrier in a longitudinal direction of the at least one carrier.

Moreover, the invention further concerns an item of furniture comprising a stationary furniture part and at least one door wing, the at least one door wing being movable relative to the stationary furniture part by a guide system of the type to be described.

WO 2018/129575 A1 to the applicant shows in FIGS. 10*a*, 10*b* a guide system for door wings, the guide system including two guide rails extending at a right angle to one another. A carrier in the form of a longitudinally extending column is provided for supporting the at least one door wing. The carrier—jointly with the two door wings—is displaceably supported in a depth direction of the furniture carcass. Therefore, the door wings—when not in use—can be countersunk in a lateral insertion compartment of the furniture carcass when the door wings are located in a parallel position to one another. For this purpose, a guide rail is fixed to the sidewall of the furniture carcass, and the carrier is displaceably supported along the guide rail in the depth direction of the furniture carcass via a supporting roller. A running carriage configured to be coupled to the door wing can be transferred from a further guide rail, extending parallel to a front edge of the furniture carcass, onto a receiving device connected to the carrier. However, the transition between the further guide rail and the receiving device of the carrier can be somewhat bumpy, depending on the weight of the door wings. Due to the weight and due to possibly performed adjustments of a position of the door wings, it might additionally be the case that the carrier is twisted or might be brought into a slanted position, whereby the supporting roller is tilted relative to the first guide rail fixed to the sidewall. Besides an unfavorable kinematics of the door wings, this may also lead to uneven strains of the supporting rollers. These uneven strains can lead to an uneven abrasion and, therefore, to a premature wear of the supporting roller.

SUMMARY OF THE INVENTION

It is an object of the invention to propose a guide system of the type mentioned in the introductory part, thereby avoiding the drawbacks as discussed above.

According to the invention, the at least one receiving device is movably supported relative the carrier in the longitudinal direction of the carrier.

In other words, the carrier and the receiving device for the running carriage are configured as components separate from one another and are configured to be limitedly displaceable relative to one another in a longitudinal direction of the carrier. In this way, the carrier and the receiving device can be decoupled from one another. As a result, the receiving device for the running carriage, for example due a load caused by a weight of the door wing or due to a twisted or slanted position of the carrier caused by an adjustment of the door wing, remains largely unaffected by these loads.

The guiding device of the carrier can include at least one running wheel configured to run along the guide rail.

According a preferred embodiment of the invention, the receiving device includes at least one supporting roller separate from the guiding device of the carrier, and the at least one supporting roller is configured to be moved along the guide rail.

Thereby, the guide rail includes a first running limb and a second running limb separate from the first running limb. The running wheel of the guiding device of the carrier is movably supported along the first running limb of the guide rail and the at least one supporting roller of the receiving device is movably supported along the second running limb of the guide rail. In other words, each of the carrier and the receiving device can include at least one or a plurality of running wheels or supporting rollers configured to run along running limbs of the guide rail, the running limbs of the guide rail being configured separate from one another. In this way, the decoupling between the carrier and the receiving device can be additionally improved. If appropriate, the running wheels of the carrier and the supporting rollers of the receiving device can also be supported on guide rails separate from one another, the guide rails extending substantially parallel to one another in a mounted position.

The carrier and the receiving device are movement-coupled to one another upon a movement along the guide rail. Preferably, the carrier and the receiving device are movement-coupled to one another without clearance upon a movement along the guide rail.

According to an embodiment of the invention, for movably supporting between the carrier and the receiving device in the longitudinal direction of the carrier, at least one protrusion can be provided. The at least one protrusion can be arranged on the carrier or on the receiving device and is configured to be displaceably guided in a recess arranged or formed on the receiving device or on the carrier. For example, the protrusion can be loosely received in the recess. Alternatively, it is also possible that a relative movement between the carrier and the receiving device, in the longitudinal direction of the carrier, can be dampened by a force of a mechanical spring element or by a damping device (for example by a hydraulic piston-cylinder-unit).

BRIEF DESCRIPTION OF THE DRAWINGS

Further details and advantages of the invention result from the following description of figures.

DETAILED DESCRIPTION OF THE INVENTION

Figure 1A:
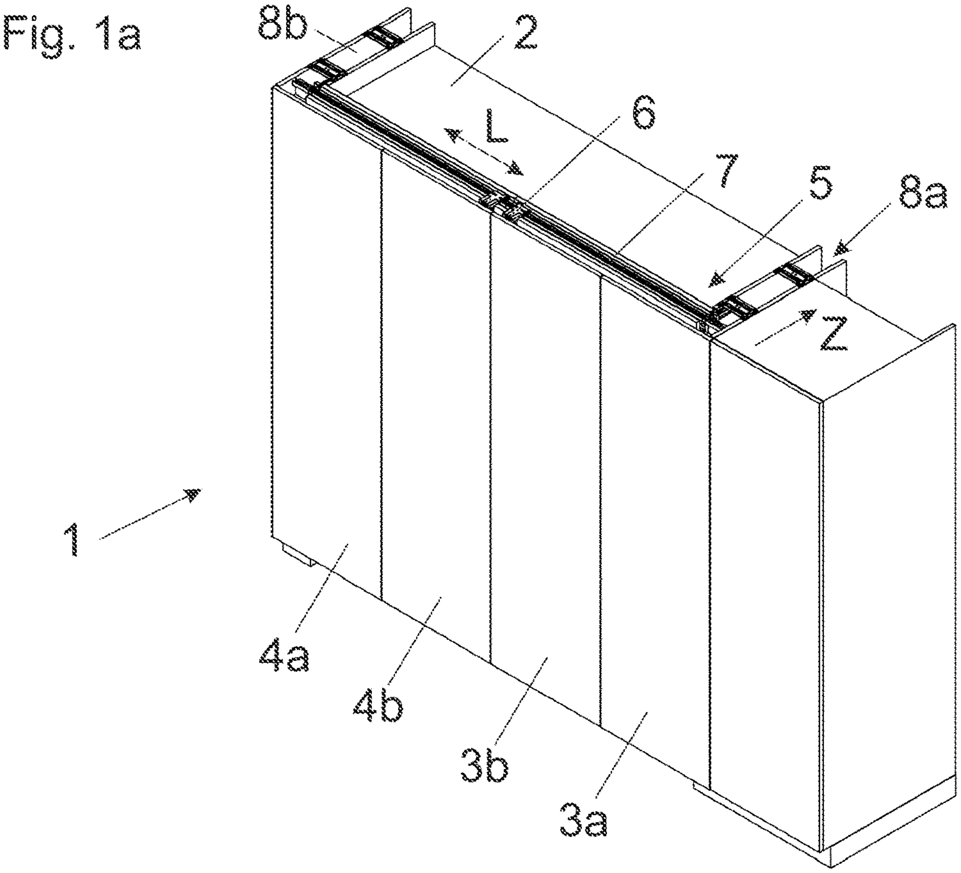
FIG. 1*a*, 1*b* are perspective views of an item of furniture comprising a furniture carcass and furniture parts movable relative thereto.

FIG. 1*a* shows a perspective view of an item of furniture 1 comprising a furniture carcass 2 and a folding-sliding-door having movable door wings 3*a*, 3*b*; 4*a*, 4*b*. Each of the door wings 3*a*, 3*b* and the door wings 4*a*, 4*a* are displaceably supported by a guide system 5 between a first position, in which the door wings 3*a*, 3*b*; 4*a*, 4*b* are aligned substantially coplanar to one another, and a second position, in which the door wings 3*a*, 3*b*; 4*a*, 4*b* are aligned substantially parallel to one another. The door wings 3*a*, 3*b*, in the second (parallel) position, can be inserted into a lateral receiving compartment 8*a* of the furniture carcass 2, whereas the door wings 4*a*, 4*b* can be inserted into a further receiving compartment 8*b* when aligned in a parallel relationship to one another. The functionality will be explained with the aid of the door wings 3*a* and 3*b*, and the same explanations apply to the door wings 4*a*, 4*b*. The guide system 5 includes a longitudinal rail 7 having a longitudinal direction (L), and a running carriage 6 configured to be coupled to the second door wing 3*b* is configured to be displaceable along the longitudinal rail 7. The longitudinal rail 7, in a mounted position, is arranged substantially horizontally and parallel to a front edge of the furniture carcass 2.

Figure 1B:
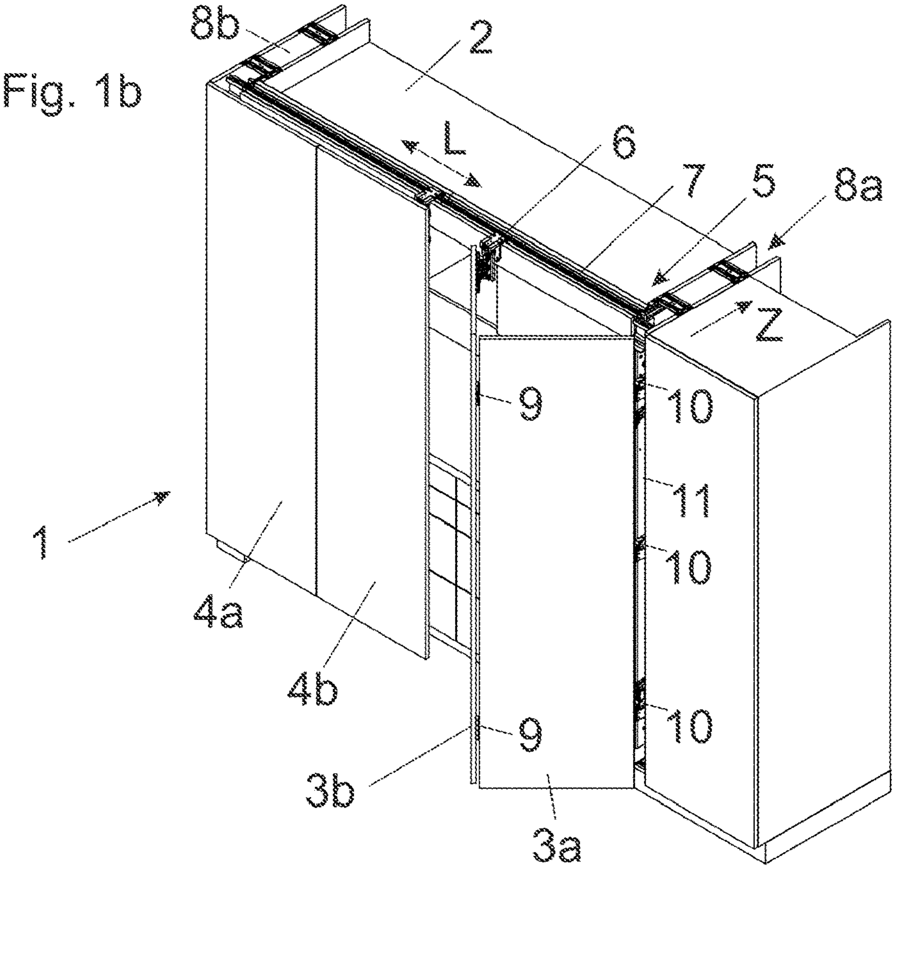

FIG. 1*b* shows the item of furniture 1, in which the door wings 3*a*, 3*b* have been moved from the coplanar position shown in FIG. 1*a* into an angled position to one another. For example, the first door wing 3*a* can be movably supported on a carrier 11 by two or more furniture hinges 10. The carrier 11 is configured to be displaceable in a depth direction (Z) into the receiving compartment 8*a*. In the shown figure, the carrier 11 is located in a transfer position, so that the running carriage 6 can be displaced between the longitudinal rail 7 and the carrier 11. In the shown transfer position, the carrier 11 is releasably locked to the longitudinal rail 7, and the locking between the longitudinal rail 7 and the carrier 11 can be released by an entry of the running carriage 6 in or on the carrier 11. The carrier 11 is in the form of a longitudinally extending column, and a length of the column corresponds to at least half of a height of the door wings 3*a*, 3*b*. The two door wings 3*a*, 3*b* are hingedly connected to one another about a vertically extending axis by at least one hinge fitting 9. The second door wing 3*b* is displaceably supported along the longitudinal rail 7 via the running carriage 6.

Figure 2A:
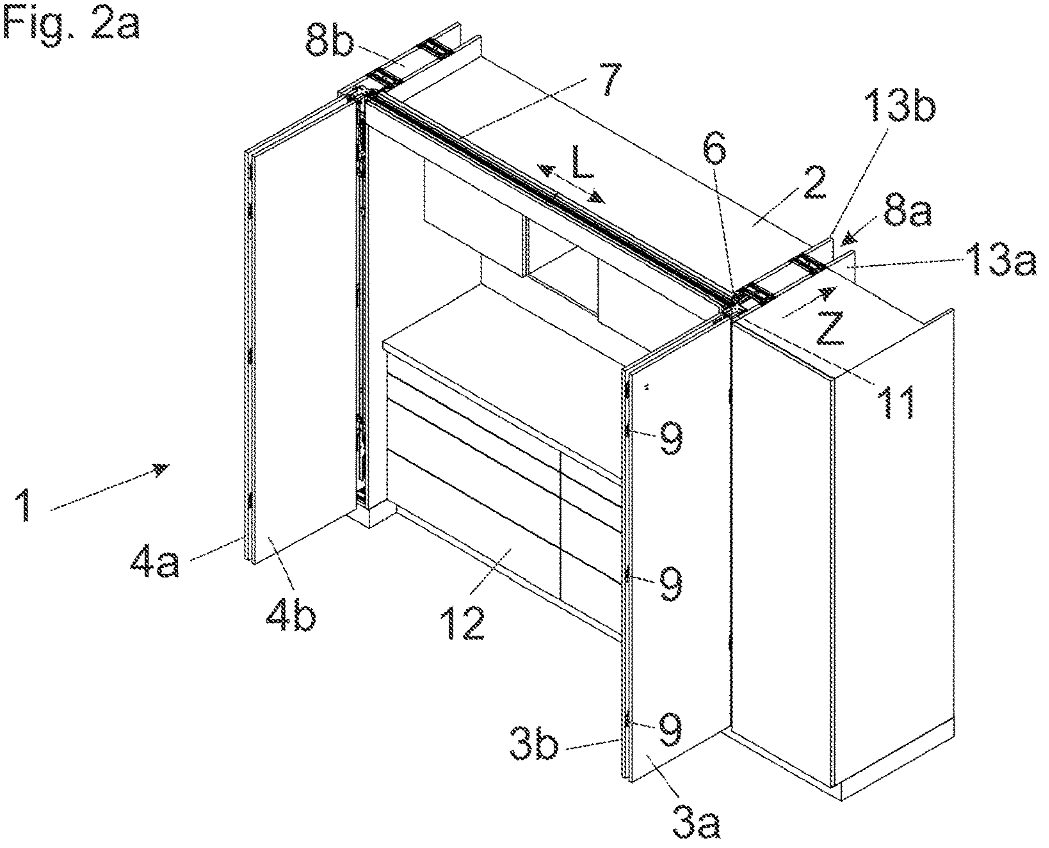
FIG. 2*a*, 2*b* show the item of furniture according to FIGS. 1*a*, 1*b* with the furniture parts in further positions to one another.

FIG. 2*a* shows the item of furniture 1 with the door wings 3*a*, 3*b* which are now aligned parallel to one another. The carrier 11 has been unlocked from the longitudinal rail 7 by an entry of the running carriage 6, so that the carrier 11 (jointly with the running carriage 6 and the door wings 3*a*, 3*b*) can be inserted in the depth direction (Z) along a guide rail 17 (FIG. 3) of the guide system 5 into the receiving compartment 8*a*, the guide rail 17 extending transversely to the longitudinal direction (L) of the longitudinal rail 7.

Figure 2B:
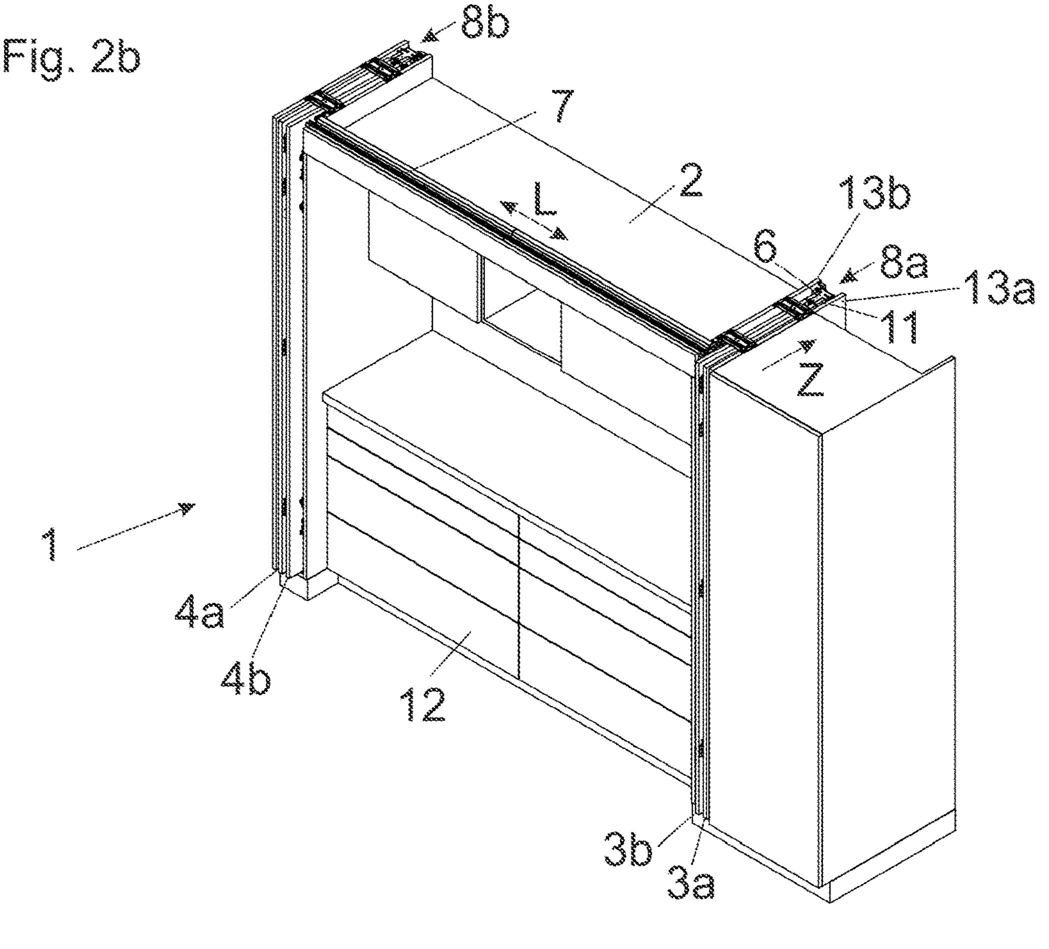

FIG. 2*b* shows the item of furniture 1 with the door wings 3*a*, 3*b* which are now located in a fully inserted condition within the receiving compartment 8*a*. The door wings 3*a*, 3*b* are thus movably supported by the guide system 5 between a first position according to FIG. 1*a*, in which the door wings 3*a*, 3*b* are aligned substantially coplanar to one another, and a second position according to FIG. 2*b*, in which the door wings 3*a*, 3*b* are aligned substantially parallel to one another and can be received within the receiving compartment 8*a*. In this way, for example, a kitchen 12 as shown in FIGS. 2*a*, 2*b* can be entirely concealed, so that the kitchen 12 can be visually separated from a remaining area of a living space. In the shown embodiment, the receiving compartment 8*a* is formed by a sidewall 13*a* and by a stationary furniture part 13*b* spaced in a parallel relationship from the sidewall 13*a*. The door wings 3*a*, 3*b* can be inserted between the sidewall 13*a* and the stationary furniture part 13*b* when the door wings 3*a*, 3*b* are located in a parallel position to one another.

Figure 3:
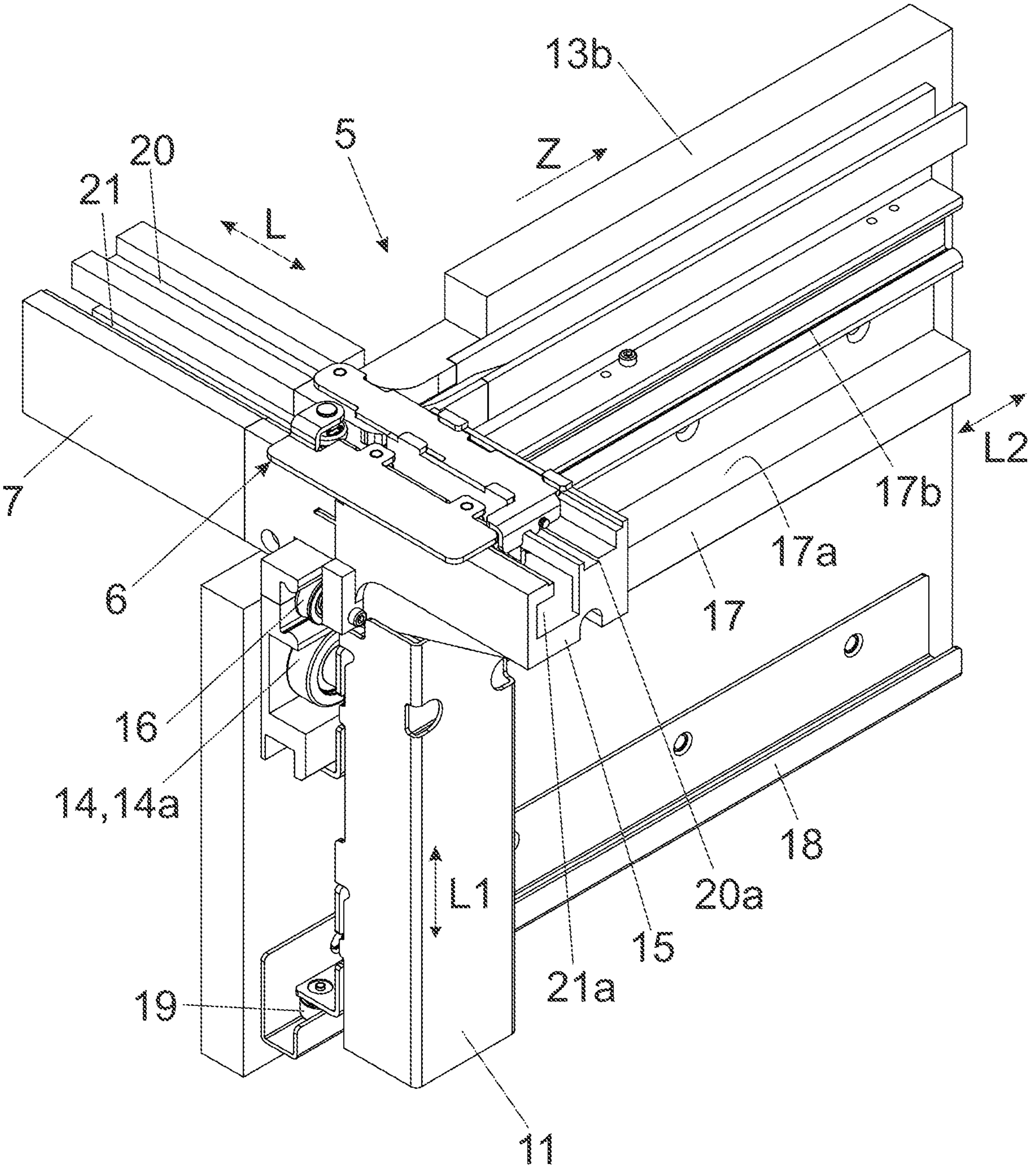
FIG. 3 shows the guide system in a perspective view, in which the receiving device is releasably locked to the longitudinal rail.

FIG. 3 shows a perspective view of the guide system 5 in a region between the sidewall 13*a* and the stationary furniture part 13*b*, between which the receiving compartment 8*a* for accommodating the door wings 3*a*, 3*b* is formed. The longitudinal rail 7 has a longitudinal direction (L) extending parallel to a front edge of the furniture carcass 2 in a mounted position. A guide rail 17 having a longitudinal direction (L2) is fixed to the stationary furniture part 13*b*, the longitudinal direction (L) of the longitudinal rail 7 and the longitudinal direction (L2) of the guide rail 17 extending transversely, preferably substantially at a right angle, to one another. The carrier 11 is configured for movably supporting the at least one door wing 3*a*, and the door wing 3*a*, for example, can be pivotally supported on the carrier 11 about a vertically extending axis in the mounted position by two or more furniture hinges 10 (FIG. 1*b*). The carrier 11 includes at least one guiding device 14 for guiding the carrier 11 along the guide rail 17 in the depth direction (Z) and in a direction opposite the depth direction (Z). In the shown figure, the guiding device 14 of the carrier 11 includes at least one running wheel 14*a* configured to run along a first guide limb 17*a* of the guide rail 17.

In the shown embodiment, the carrier 11 can be releasably locked to the longitudinal rail 7 via a receiving device 15. The receiving device 15 is configured to receive the running carriage 6, so that the running carriage 6 can be moved from the longitudinal rail 7 into the receiving device 15. For this purpose, guide grooves 20, 21 may be arranged in the longitudinal rail 7, the guide grooves 20, 21 extending in the longitudinal direction (L) of the longitudinal rail 7 and being aligned flush with corresponding guide grooves 20*a*, 21*a* of the receiving device 15 in the transfer position of the receiving device 15. In this way, the running wheels 6*a*, 6*b* (FIG. 6*b*) of the running carriage 6 can be displaced between the longitudinal rail 7 and the receiving device 15 without a disturbing abutting edge.

According to the invention, the receiving device 15 is configured to be movable relative to the carrier 11 in the longitudinal direction (L) of the carrier 11. In this way, the receiving device 15 and the carrier 11 can be displaced relative to one another in the longitudinal direction (L1) of the carrier 11, so that the receiving device 15 can be decoupled from undesired torsional movements or sagging movements of the carrier 11 caused by a force exertion applied to the carrier 11 (for example due to a weight of the door wings 3*a* or due to an adjustment device for adjusting a position of the door wing 3*a*). This has the consequence that the guide grooves 20, 21 of the longitudinal rail 7 and the guide grooves 20*a*, 21*a* of the guiding device 15, in the transfer position, always remain aligned flush to one another upon a sagging movement or upon a torsional movement of the carrier 11. Therefore, a precise displacement of the running carriage 6 between the longitudinal rail 7 and the receiving device 15 can be ensured.

For the improved decoupling between the receiving device 15 and the carrier 11, the receiving device 15 can include at least one supporting roller 16 separate from the guiding device 14 of the carrier 11, the at least one supporting roller 16 being configured to run along the guide rail 17. Preferably, the guide rail 17 includes a first running limb 17*a* and at least one second running limb 17*b* separate from the first running limb 17*a*. The running wheel 14*a* of the guiding device 14 is movably supported along the first running limb 17*a* of the guide rail 17, and the at least one supporting roller 16 of the receiving device 15 is movably supported along the second running limb 17*b* of the guide rail 17.

The carrier 11 and the receiving device 15, upon a movement along the guide rail 17 in the depth direction (Z), are connected to one another in a movement-coupled manner. Preferably, the carrier 11 and receiving device 15, upon a movement along the guide rail 17 in the depth direction (Z) and in a direction opposite the depth direction (Z), are coupled to one another without clearance. For the improved support of the carrier 11, a further (second) guide rail 18 can be provided, and at least one further running wheel 19 of the carrier 11 is displaceably supported along the further guide rail 18.

Figure 4:
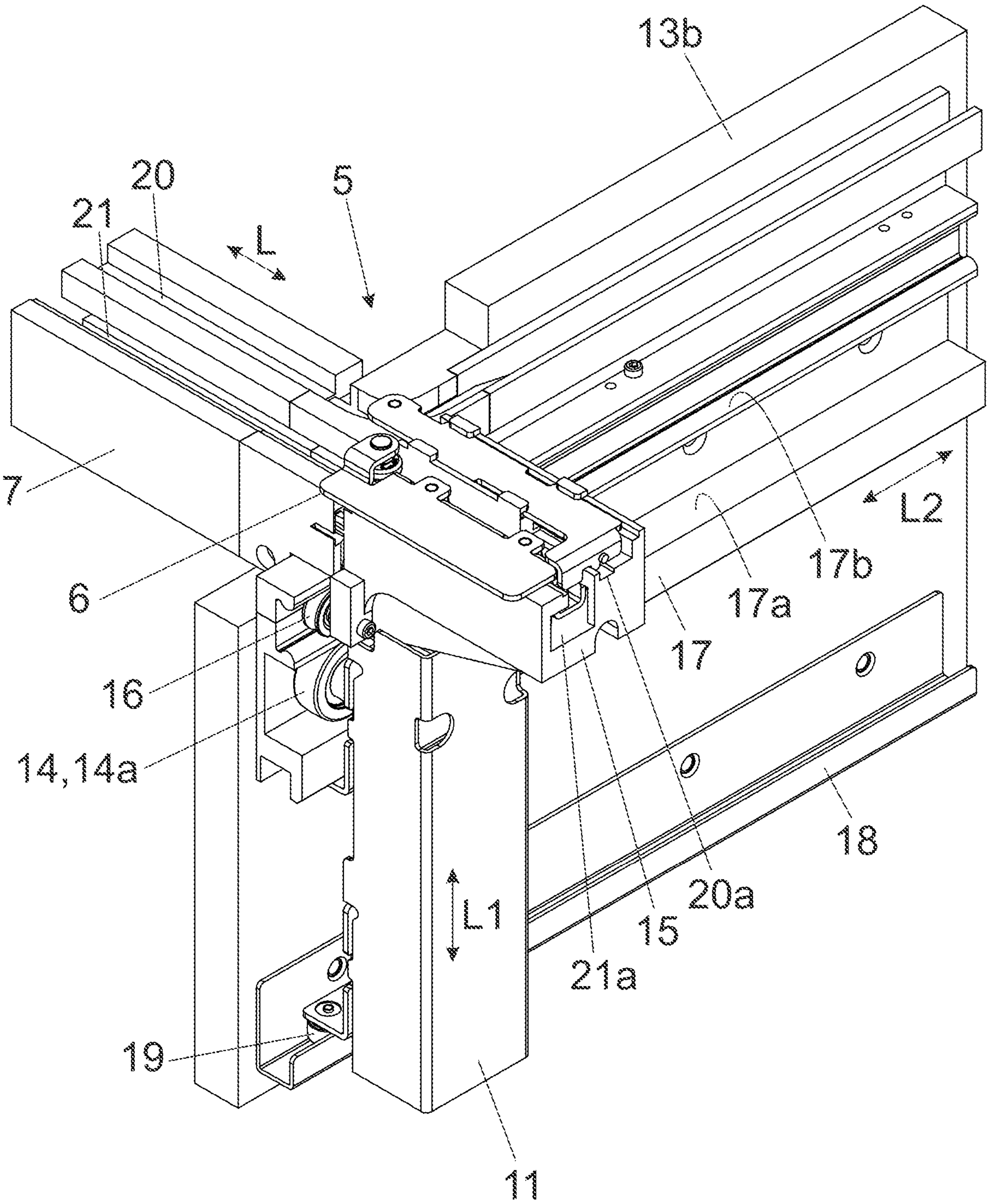
FIG. 4 shows the guide system according to FIG. 3, in which the receiving device is unlocked from the longitudinal rail.

FIG. 4 shows the guide system 5, in which the receiving device 15 has been unlocked from the longitudinal rail 7 by an entry of the running carriage 6. Therefore, the carrier 11, the receiving device 15 and the running carriage 6 arranged on the receiving device 15 for supporting the door wing 3*b* have been released so as to be movable in the depth direction (Z). The carrier 11 can be displaced along the first running limb 17*a* of the guide rail 17 by the running wheel 14*a*, whereas the supporting roller 16 of the receiving device 15 is configured to roll along the second running limb 17*b* of the guide rail 17. The carrier 11 can be supported on the further guide rail 18 by at least one further running wheel 19.

Figure 5:
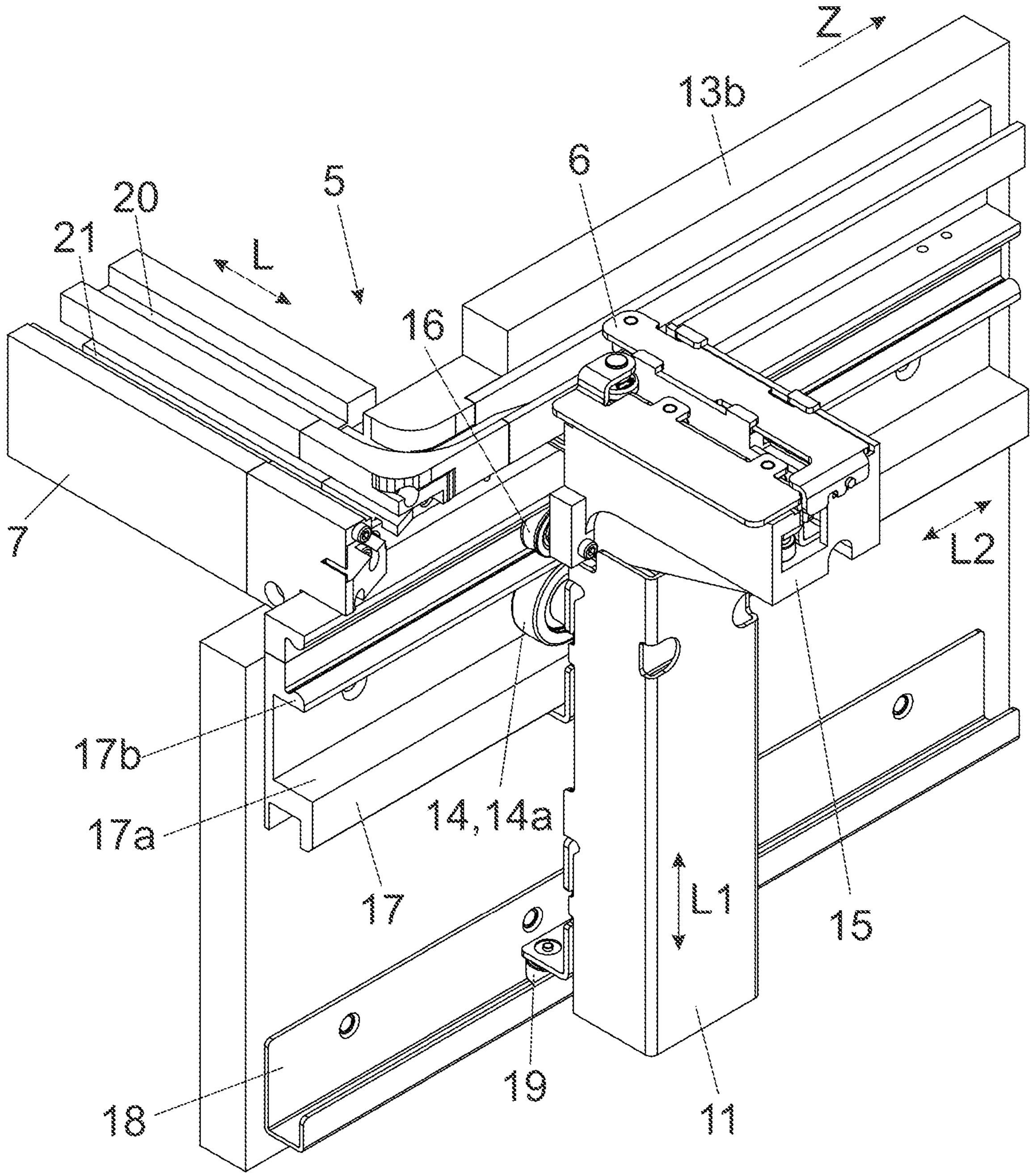
FIG. 5 shows the guide system in a further position of the carrier in a depth direction of the furniture carcass.

FIG. 5 shows a further position of the carrier 11 in the depth direction (Z). The first door wing 3*a* is movably connected to the carrier 11. The second door wing 3*b* is guided via the running carriage 6, the second door wing 3*b* being hingedly connected to the first door wing 3*a*. Upon a movement of the carrier 11 in the depth direction (Z), the receiving device 15, the running carriage 6 supported on the receiving device 15 and therewith the door wings 3*a*, 3*b* aligned parallel to one another can also be inserted in the depth direction (Z) into the receiving compartment 8*a*.

Figure 6A:
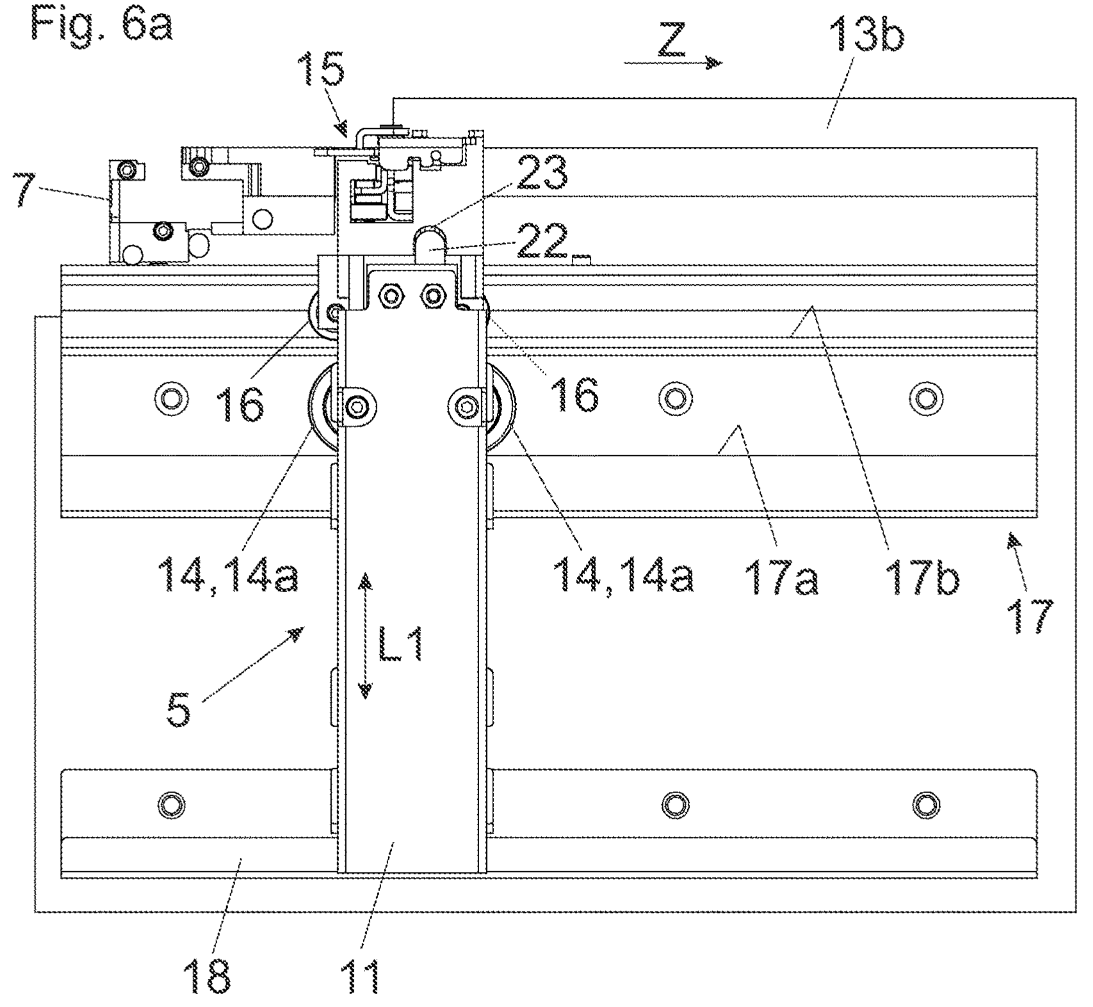
FIG. 6*a*, 6*b* shows the guide system in a side view and a perspective view of the running carriage arranged on the receiving device.

FIG. 6*a* shows a side view of the guide system 5 in a mounted condition, the position of the carrier 11 in the depth direction (Z) corresponding to the position of the carrier 11 as previously shown in FIG. 5. The guide rail 17 with the running limbs 17*a*, 17*b* spaced from one another in the height direction is arranged on the stationary furniture part 13*b*. The running wheels 14*a* of the carrier 11 can be displaced along the first running limb 17*a* and the supporting rollers 16 of the receiving device 15 can be displaced along the second running limb 17*b* of the guide rail 17. It can be seen that for the movable support between the carrier 11 and the receiving device 15 in the longitudinal direction (L1) of the carrier 11, at least one protrusion 22 is provided, the at least one protrusion being arranged on the carrier 11 or on the receiving device 15. The at least one protrusion 22 is displaceably guided in a recess 23 arranged on the receiving device 15 or on the carrier 11. For example, the at least one protrusion 22 can be in the form of a cylindrical pin configured to be received within a cylindrical recess 23. In this way, upon a possible torsion of the carrier 11 about its longitudinal axis (L1), no torque is exerted onto the receiving device 15. As a result, the receiving device 15, in the transfer position, remains exactly aligned with respect to the longitudinal direction (L) of the longitudinal rail 7 despite a torsion of the carrier 11 about its longitudinal axis (L1). Of course, for the movable support between the carrier 11 and the receiving device 15, two or more protrusions 22 may also be provided, the two or more protrusions 22 being displaceably guided in a plurality of corresponding recesses 23.

Figure 6B:
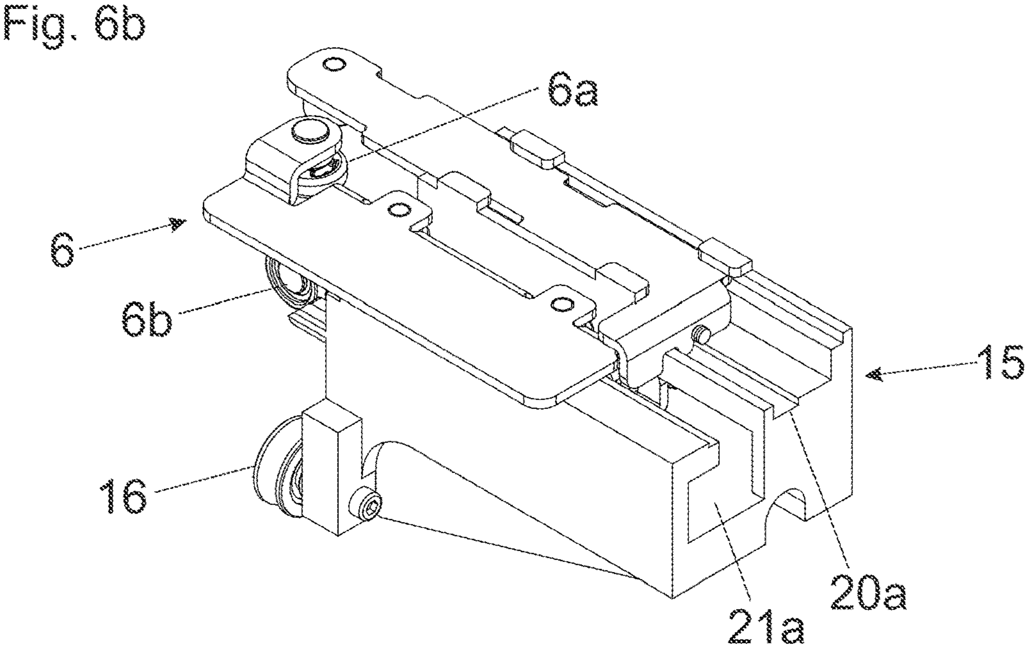

FIG. 6*b* shows the receiving device 15 with the guide grooves 20*a* and 21*a* which are aligned flush with the guide grooves 20, 21 of the longitudinal rail 7 in the transfer position of the receiving device 15, in which the receiving device 15 adjoins the longitudinal rail 7 in the longitudinal direction (L). It can be seen that the supporting roller 16 is configured to run along the second running limb 17*a* of the guide rail 17. The supporting roller 16 can be configured as a concave roller, for example as a double-tapered roller, whereby the supporting roller 16 can be precisely and smoothly guided along the guide rail 17 in the depth direction (Z). The receiving device 15 is configured to receive the running carriage 6, the running carriage 6 having at least one running wheel 6*a* with a vertical rotational axis and at least one running wheel 6*b* with a horizontal rotational axis.

The invention claimed is:

1. A guide system for guiding a movably-supported door wing relative to a stationary furniture part, the guide system comprising:

a carrier configured to movably support the door wing;

a guide rail to be fixed to the stationary furniture part for guiding the carrier;

a guiding device configured to displaceably support the carrier along the guide rail;

a running carriage to be coupled to the wing; and a receiving device configured to receive the running carriage, the receiving device adjoining the carrier in a longitudinal direction of the carrier, wherein the receiving device is supported so as to be movable relative to the carrier along the longitudinal direction of the carrier.

2. The guide system according to claim 1, wherein the guiding device of the carrier includes a running wheel configured to movably support the carrier along the guide rail.

3. The guide system according to claim 1, wherein the receiving device includes a supporting roller separate from the guiding device of the carrier, the supporting roller movably supporting the receiving device along the guide rail.

4. The guide system according to claim 3, wherein the guide rail includes a first running limb and a second running limb separate from the first running limb, a running wheel of the guiding device movably supporting the carrier along the first running limb of the guide rail, and the supporting roller of the receiving device movably supporting the receiving device along the second running limb of the guide rail.

5. The guide system according to claim 1, wherein the carrier and the receiving device are connectable to one another so as to be movable along the guide rail in a coupled manner.

6. The guide system according to claim 1, wherein that the carrier and the receiving device are configured to be coupled to one another without clearance during movement along the guide rail.

7. The guide system according to claim 1, further comprising a protrusion configured to allow movable support between the carrier and the receiving device along the longitudinal direction of the carrier, the protrusion being arranged on a first one of the carrier or on the receiving device and being displaceably guided in a recess arranged in a second one of the receiving device or the carrier.

8. The guide system according to claim 1, wherein the guide rail is to be fixed to the stationary furniture part such that a longitudinal axis of the guide rail is substantially parallel to a depth direction of the stationary furniture part.

9. The guide system according to claim 1, further comprising a longitudinal rail to be mounted so as to extend transversely to the guide rail.

10. The guide system according to claim 9, wherein the receiving device is configured to be moved into a transfer position in which the receiving device adjoins the longitudinal rail along a longitudinal direction of the longitudinal rail such that the running carriage is transferrable between the longitudinal rail and the receiving device.

11. The guide system according to claim 10, wherein the receiving device is releasably locked to the longitudinal rail in a transfer position, and the locking between the longitudinal rail and the receiving device is releasable by entry of the running carriage into the receiving device.

12. The guide system according to claim 1, wherein the carrier has a longitudinal direction extending substantially vertically in a mounted position.

13. An item of furniture comprising:

a stationary furniture part;

a door wing movably supported relative to the stationary furniture part; and the guide system according to claim 1 configured to guide the door wing relative to the stationary furniture part.

14. The item of furniture according to claim 13, wherein the guide rail is arranged on the stationary furniture part, the guide rail extending in a depth direction of the stationary furniture part, and the door wing is movably connected to the carrier and is movably supported, jointly with the carrier, along the guide rail in a depth direction of the stationary furniture part.

15. The item of furniture according to claim 14, wherein the door wing is a first door wing, the item of furniture further comprising a second door wing hingedly connected to the first door wing, wherein the first door wing and the second door wing are movably supported between a first position, in which the first door wing and the second door wing are aligned substantially coplanar to one another, and a second position, in which the first door wing and the second door wing are aligned substantially parallel to one another, wherein the first door wing and the second door wing, starting from the second position, are displaceably supported, jointly with the carrier, along the guide rail in the depth direction of the stationary furniture part.

16. The guide system according to claim 9, wherein the longitudinal rail extends substantially at a right angle to the guide rail.

* * * * *